__United States Patent__ [19]

Nomamoto

[11] 3,802,040

[45] Apr. 9, 1974

[54] METHOD OF FORMING A RECTANGULAR GROOVE AT AN APEX OF AN ANGULAR WORKPIECE

[75] Inventor: Yoshiaki Nomamoto, Hiroshima, Japan

[73] Assignee: Toyo Kogyo Co., Ltd., Fuchu-cho, Aki-gun, Hiroshima-ken, Japan

[22] Filed: Nov. 6, 1972

[21] Appl. No.: 303,799

[52] U.S. Cl............... 29/90, 29/95.1, 29/156.5, 29/557, 29/567
[51] Int. Cl............................................. B24b 39/00
[58] Field of Search......... 29/156.5, 557, 567, 95.1, 29/90

[56] References Cited
UNITED STATES PATENTS
2,585,166   2/1952   Phaneuf................................. 29/90
1,477,266   12/1923   Jenking................................. 29/95.1
1,425,122   8/1922   McKechnie et al.................. 29/95.1

*Primary Examiner*—Leonidas Vlachos
*Attorney, Agent, or Firm*—William A. Knoeller

[57] ABSTRACT

Herein disclosed are a method of forming a rectangular groove having accurately rectangular cross-section at an apex of an angular workpiece, and a combination tool therefor. The method comprises the steps of broaching the apex portion of the angular workpiece to form a preparatory dove-tailed groove having its bottom width substantially equal to that of the finally obtainable rectangular groove of a desired width and its top width slightly smaller than said desired width, and burnishing said preparatory dove-tailed groove to finally obtain the rectangular groove having its bottom and top of said desired width. The method may further comprise the step of initially broaching the apex portion to form a preparatory rectangular groove having its width slightly smaller than the top width of the dove-tailed groove.

4 Claims, 15 Drawing Figures

METHOD OF FORMING A RECTANGULAR GROOVE AT AN APEX OF AN ANGULAR WORKPIECE

BACKGROUND OF THE INVENTION

This invention relates to formation of a rectangular groove at an apex of an angular workpiece.

A rectangular groove at an apex of an angular workpiece has heretofore been prepared by the method in which a preparatory groove smaller than the desired groove is first formed and then it is lapped or ground into the desired size.

However, the conventional method has disadvantages in that it is by no means efficient, and in that accuracy of the product is not sufficient even if it adopts the burnishing method. This is because the top edges of the rectangular groove will be expanded outwardly during the burnishing process by the plastic deformation experienced at the bottom of the groove, so that the burnishing effects are completely nullified.

This invention, therefore, contemplates to eliminate the above-mentioned disadvantages concomitant with the conventional method of forming a rectangular groove.

It is an object of this invention to provide an efficient method of and a combination tool for forming a rectangular groove having an accurately rectangular cross-section at an apex of an angular workpiece.

Another object of the invention is to provide a method of forming the same in which a burnishing process is effectively adopted for mass production with resultant excellent burnishing effects exerted on the inner groove surfaces in its entirety.

Still another object is to provide a method of forming the same in which a dove-tailed groove of predetermined size is first formed and then it is burnished into a desired final rectangular groove.

A further object is to provide a combination tool suitable for use in the above-mentioned method.

SUMMARY OF THE INVENTION

In accordance with a primary aspect of this invention, the foregoing and other objects are attained by a method of forming a rectangular groove having accurately rectangular cross-section at an apex of an angular workpiece, which method comprises: broaching the apex to form a preparatory dove-tailed groove having its bottom width substantially the same as that of the finally obtainable rectangular groove of a desired width and its top width slightly smaller than said desired width; and burnishing said preparatory dove-tailed groove to finally obtain the rectangular groove having its bottom and top of said desired width.

In accordance with a secondary aspect of the invention, the objects are also attained by a combination tool for use in the method, which tool comprises: a gradient dove-tail portion disposed at the front side of said tool and including a plurality of dove-tailed blade members which are arranged lengthwise of said tool in a manner to have their heights and widths progressively and stepwise increased toward the rear of said tool, so as to progressively form, when pressed against the apex, a preparatory dove-tailed groove having its bottom width substantially the same as that of the finally obtainable rectangular groove of the desired width and its top width slightly smaller than said desired width; and a burnishing portion disposed at the rear side of said tool and including a plurality of burnishing buttons which are arranged lengthwise of said tool in a manner to have their bulging amounts progressively and stepwise increased toward the rearmost of said tool, so as to finally obtain, when pressed against said preparatory dove-tailed groove along said preparatory dove-tailed groove, the rectangular groove having it bottom and top of the same desired width.

BRIEF DESCRIPTION OF THE DRAWINGS

This invention will now be described in more detail with reference to the accompanying drawings, in which.

DESCRIPTION OF THE PREFERRED EMBODIMENTS

Figure 1A:
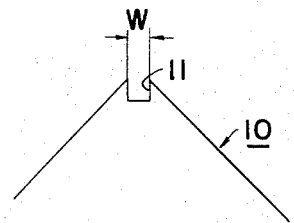
FIGS. 1a to 1c are schematic sectional views of an apex portion of a rotor of a rotary piston engine on which a preparatory rectangular groove, preparatory dove-tailed groove, and desired rectangular apex-seal groove are respectively formed in the order of steps of the method according to this invention.

Reference is now to be made to the drawings, in which like reference numerals indicate identical or corresponding parts or elements throughout the figures.

Figure 1B:
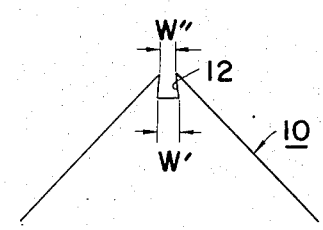
Figure 1C:
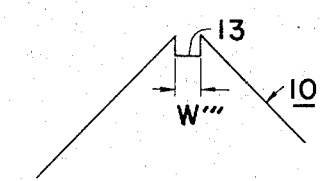

The multi-lobed rotor is one embodiment of the angular workpiece. In FIGS. 1a to 1d, a reference numeral 10 designates an apex portion of a multi-lobed rotor of a rotary engine. As shown in FIG. 1a, a preparatory rectangular groove 11 having a width of w may preferably be formed at the apex portion 10. In FIG. 1b, on the other hand, a preparatory dove-tailed groove 12 is formed at the apex portion 10, while a desired or finished rectangular apex-seal groove 13 is also formed, as shown in FIG. 1c. The dove-tailed groove 12 is shown to have a bottom width of $w'$ and a top width of $w''$. The final width of the desired rectangular groove 13 is also shown at character $w'''$ in FIG. 1c. The dimensional relationships between the above widths $w$, $w'$, $w''$ and $w'''$ are preset as follows: The bottom width $w'$ of the dove-tailed groove 12 is greater than the width $w$ of the preparatory rectangular groove 11, and is substantially equal to or slightly smaller than the width $w'''$ of the resultant rectangular groove 13. The top width $w''$ of the dove-tailed groove 12 is slightly greater than the width $w$ of the preparatory rectangular groove 11.

Figure 1D:
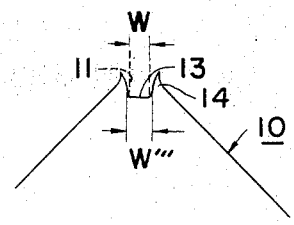
FIG. 1d is a schematic sectional view of an apex portion of a rotor on which a defective rectangular groove is formed by the conventional method.

As illustrated in FIG. 1d, on the contrary, when the conventional method is used which, for example, includes the steps of broaching the apex portion 10 to form the preparatory rectangular groove 11 (shown by dotted lines) having a width w of e.g., about 4.0 mm; and subsequently burnishing the formed rectangular groove 11 so as to obtain a desired rectangular apex-seal groove 13 having a width w''' of e.g., about 4.01 mm, then each of the top edges of the groove 13 tends to be expanded outwardly by about $20\mu$, which expansion is well known in the art as a burr 14. Thus, the conventional method fails to present an accurately rectangular apex-seal groove.

When, however, the method and tool of this invention are used, the width w of the preparatory rectangular groove 11 is, for example, about 3.9 mm, the top and bottom widths w'' and w' of preparatory dove-tailed groove 12 are respectively about 3.9 mm and 3.95 mm, and the obtained rectangular apex-seal groove 13 has a width w''' of about 4.01 mm with highly accurate side surfaces.

Figures 4, 5, 6:
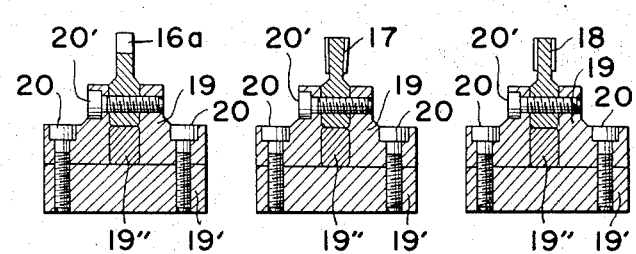
FIGS. 4 to 6 are transverse sectional views taken along the lines IV — IV, V — V and VI — VI of FIGS. 3, respectively.
Figure 2:
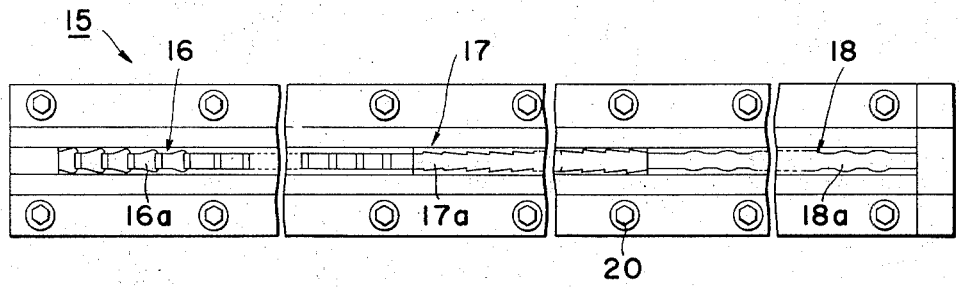
FIGS. 2 and 3 are plan and side views, respectively, showing an example of the tool embodying this invention.
Figure 3:
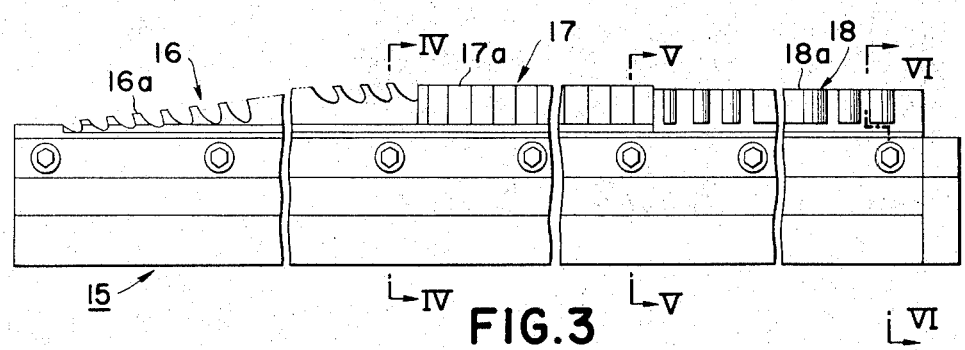
Figure 7:
FIGS. 7 and 8 are plan and side views, respectively, showing a modification of the tools embodying the invention.
Figure 8:
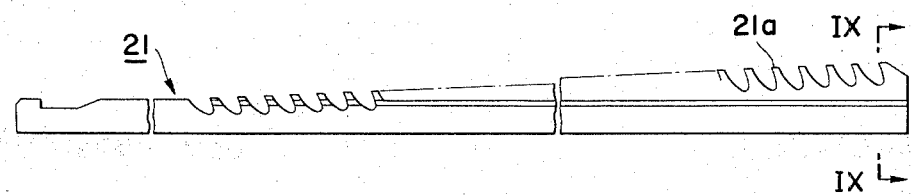

Turning now to FIGS. 2 to 6, there is shown a combination tool or broach 15 for use in forming a rectangular apex-seal groove in accordance with this invention. The combination tool 15 may preferably include a gradient blade portion 16 of a suitable length disposed at the frontmost of the tool 15. This gradient blade portion 16 is composed of a number of rectangular blade members 16a which are arranged lengthwise of the tool 15 in a manner to have their heights progressively and stepwise increased toward the rear of the tool 15, so as to progressively form the preparatory rectangular groove 11 having a width of w considerably smaller than the width w''' of the desired or finished apex-seal groove 13. The combination tool 15 further includes a gradient dove-tail portion 17 disposed at a relatively front side or midway of the tool 15. This dove-tail portion 17 is also of a suitable length and includes a number of dove-tailed blade members 17a. These blade members 17a are also arranged lengthwise of the tool 15 in a fashion to have their heights and width progressively and stepwise increased toward the rear of the tool 15, to thereby progressively form the preparatory dove-tailed groove 12 having its bottom width w' substantially the same as the width w''' of the final apex-seal groove 13 and its top width w'' slightly smaller than the above width w'''. A burnishing portion 18 is also provided in the combination tool 15 and is disposed at the rear side thereof. This burnishing portion 18 is provided with a number of burnishing buttons 18a which are arranged lengthwise of the tool 15 such that they have their bulging amounts progressively and stepwise increased toward the rearmost of the tool 15 so as to form the desired apex-seal groove 13 of the desired width w'''. These three portions 16, 17 and 18 are fixed to jigs 19, 19' and 19'' by suitable means such as screws 20 and 20', as best shown in FIGS. 4 to 6.

Figure 10:
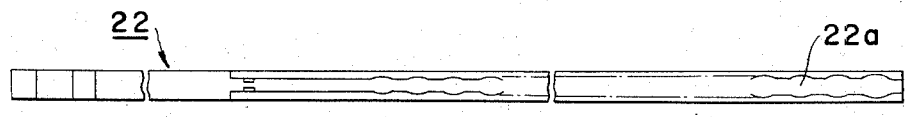
FIGS. 10 and 11 are plan and side views, respectively, showing another modification of the tools for use with the tool of FIG. 7.
Figure 11:
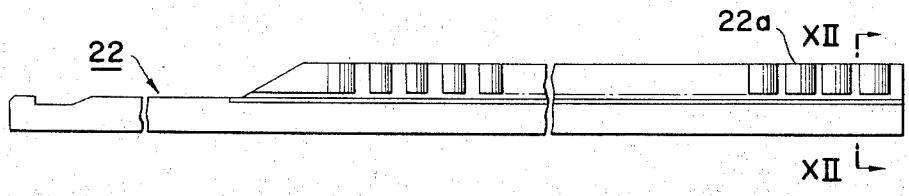
Figure 9:
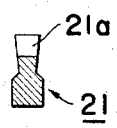
FIG. 9 is a transverse sectional view taken along the ine IX — IX of FIG. 8.
Figure 12:
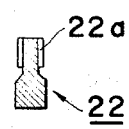
FIG. 12 is a transverse sectional view taken along the line XII — XII of FIG. 10.

The gradient dove-tail portion and the burnishing portion may be separately fixed to two different jigs as shown in FIGS. 7 to 11 as at 21 and 22. The dove-tail portion 21 for use in directly forming the dove-tailed preparatory groove also includes a number of dove-tailed blade members 21a which are arranged lengthwise of the tool in a manner to have their heights and widths progressively and stepwise increased toward the rear of the tool. This dove-tail portion 21 may desirably be located at a relatively rear side of the tool. Although not numbered, the gradient blade portion may be disposed at a relatively front side of the tool, if desired. The burnishing portion 22 is, on the other hand, disposed at the tool throughout the substantially lengthwise range thereof, as shown in FIGS. 10 and 11. This burnishing portion 22 also includes a number of burnishing buttons 22a which are arranged such that they have their bulging amounts progressively and stepwise increased toward the rearmost of the tool. Thus, the burnishing portion 22 operates, when used, to progressively form the desired apexseal groove of the desired width.

When it is intended to machine an apex portion of a multi-lobed rotor of a rotary engine so as to form a desired apex-seal groove of accurately rectangular cross-section, preparation is made by securing the combination tool 15 to a suitable broaching machine (not shown). Then, the tool is pulled by the broaching machine while being pressed on the apex portion 10, as shown in FIGS. 1a to 1c. In this way, the preparatory rectangular groove 11 is first formed by the gradient blade portion 16. This rectangular groove thus formed is then processed by the gradient dove-tail portion 17 so that the preparatory dove-tailed groove 12 is formed. This dove-tailed groove is subsequently burnished by the burnishing portion 18 to finally form the desired rectangular apex-seal groove 13.

Since, on the other hand, the operation of the separately provided dove-tail portion and burnishing portion 21 and 22 is similar excepting that the machining operation should be carried out at two different stages, the detailed explanation will be superfluous and accordingly omitted.

It should be appreciated that according to this invention the mass production of an angular workpiece, such as a multi-lobed rotor of a rotary engine, can be made possible with its rectangular grooves machined accurately. This can be easily reflected by the fact that a number of workpieces piled are broached and burnished at a time.

It should also be appreciated that the method and tool of the invention have made it possible to form a rectangular groove at an apex portion of an angular workpiece, with ease, high accuracy, and high producibility.

What is claimed is:

1. A method of forming a rectangular groove having an accurate rectangular cross-section at an apex portion of an angular workpiece, said method comprising the steps of broaching the apex portion to form a preparatory dove-tailed groove having its bottom width substantially equal to that of the finally obtainable rectangular groove of a desired width and its top width slightly smaller than said desired width, and burnishing said preparatory dove-tailed goove to finally obtain the rectangular groove having its bottom and top of said desired width.

2. A method according to claim 1, further comprising the step of broaching, before the above-mentioned broaching step, the apex portion to form a preparatory rectangular groove having its width slightly smaller than the top width of said dove-tailed groove.

3. A combination tool for forming a rectangular groove having accurately rectangular cross-section at an apex portion of an angular workpiece, said combination tool comprising: a gradient dove-tail portion disposed at a relatively front side of said tool and including a plurality of dove-tailed blade members which are arranged lengthwise of said tool in a manner to have their heights and widths progressively and stepwise increased toward rear of said tool, so as to progressively form, when pressed against the apex portion, a preparatory dove-tailed groove having its bottom width substantially equal to that of the finally obtainable rectangular groove of a desired width and its top width slightly smaller than said desired width; and a burnishing portion disposed at a relatively rear side of said tool and including a plurality of burnishing buttons which are arranged lengthwise of said tool in a manner to have their bulging amounts progressively and step-wise increased toward the rearmost of said tool, so as to finally obtain, when pressed against and along said preparatory dove-tailed groove, the rectangular groove having its bottom and top of said desired width.

4. A combination tool according to claim 3, further comprising a gradient blade portion disposed at the frontmost of said tool and including a plurality of rectangular blade members which are arranged lengthwise of said tool in a manner to have their heights progressively and stepwise increased toward the rear of said tool, so as to progressively form, when first pressed against the apex portion before the formation of said preparatory dove-tailed groove, a preparatory rectangular groove having its width slightly smaller than the top width of said dove-tailed groove.

* * * * *